United States Patent [19]

Yamamoto et al.

[11] Patent Number: 5,444,494
[45] Date of Patent: * Aug. 22, 1995

[54] VIDEO SIGNAL SYSTEM CONVERTING CIRCUIT FOR PROCESSING VIDEO SIGNAL HAVING INTERLACED SCANNING LINES TO PRODUCE VIDEO SIGNAL HAVING SEQUENTIAL SCANNING LINES

[75] Inventors: Yukinori Yamamoto; Masahiro Araya; Hiroshi Iwamura; Takehiko Shioda, all of Tokyo, Japan

[73] Assignee: Pioneer Electronic Corporation, Tokyo, Japan

[ * ] Notice: The portion of the term of this patent subsequent to Apr. 19, 2011 has been disclaimed.

[21] Appl. No.: 173,887

[22] Filed: Dec. 27, 1993

Related U.S. Application Data

[62] Division of Ser. No. 721,867, Jun. 26, 1991, Pat. No. 5,305,112.

[30] Foreign Application Priority Data

Jun. 29, 1990 [JP] Japan .................. 2-169841
Jul. 9, 1990 [JP] Japan .................. 2-179581
Jul. 16, 1990 [JP] Japan .................. 2-185349
Jul. 16, 1990 [JP] Japan .................. 2-185350

[51] Int. Cl.[6] .................................. H04N 7/01
[52] U.S. Cl. ........................ 348/448; 348/458; 348/459
[58] Field of Search ........... 358/310, 335, 330, 334; 348/441, 491, 448, 458, 459, 450; H04N 9/79, 5/76

[56] References Cited

U.S. PATENT DOCUMENTS

| | | | |
|---|---|---|---|
| 5,018,010 | 5/1991 | Masumoto | 358/138 |
| 5,029,001 | 7/1991 | Tanaka et al. | 358/140 |
| 5,029,002 | 7/1991 | Citta et al. | 388/141 |
| 5,031,040 | 7/1991 | Maruyama | 358/140 |
| 5,049,994 | 9/1991 | Nakamura | 358/140 |
| 5,117,289 | 5/1992 | Farley et al. | 358/140 |
| 5,305,112 | 4/1994 | Yamamoto et al. | 358/310 |

Primary Examiner—Tommy P. Chin
Assistant Examiner—Khoi Truong
Attorney, Agent, or Firm—Sughrue, Mion, Zinn, Macpeak & Seas

[57] ABSTRACT

A video signal recording and reproducing system enables recording and reproducing of a video signal with high quality. The system includes a recording system for recording the video signal on a record medium by a median filter and a reproducing system for reproducing the video signal from the record medium. The recording system separates a brightness signal and a color signal from an interlaced scanning signal. The recording system divides picture elements of each line into two phases by sorting the elements such that an element is put into one phase and the next element into the other. The recording system then carries out two-dimensional subsampling to the brightness signal and the color signal to reduce the amount of data. Then, the recording system compresses and time-division multiplexes the brightness signal and the color signal to provide a video signal to be recorded onto a record medium. The reproducing system separates the brightness signal and the color signal from a video signal read out from the record medium, and then interpolates picture elements into the two signals to obtain sequential scanning RGB signals for 525 scanning lines.

2 Claims, 19 Drawing Sheets

$A_{n-1}$ $B_n$ $A_n$ $B_{n+1}$ $A_{n+1}$ $$Sd' = \frac{Sd}{2} + \frac{Sa}{4} + \frac{Sb}{4}$$

$$Sh' = \frac{Sh}{2} + \frac{Se}{4} + \frac{Sf}{4}$$

$$Sk' = \frac{Sk}{2} + \frac{Si}{4} + \frac{Sa}{4}$$

$C_1$ 
⋮
$C_n$ 
$C_{n+1}$ 
⋮
$C_{525}$ $A_{n-2}$ $A_{n-1}$ $B_n$ $A_n$ $B_{n+1}$ $A_{n+1}$ $B_{n+2}$ $$Sr' = \frac{Sr}{2} + \frac{Ss}{4} + \frac{S\gamma}{4}$$

$$Sw' = \frac{Sw}{2} + \frac{St}{4} + \frac{Sv}{4}$$

$$Sz' = \frac{Sz}{2} + \frac{Sx}{4} + \frac{Sp}{4}$$

$D_1$
.
.
.
$D_{n+1}$ $D_{n+2}$ 
.
.
.
$D_{525}$

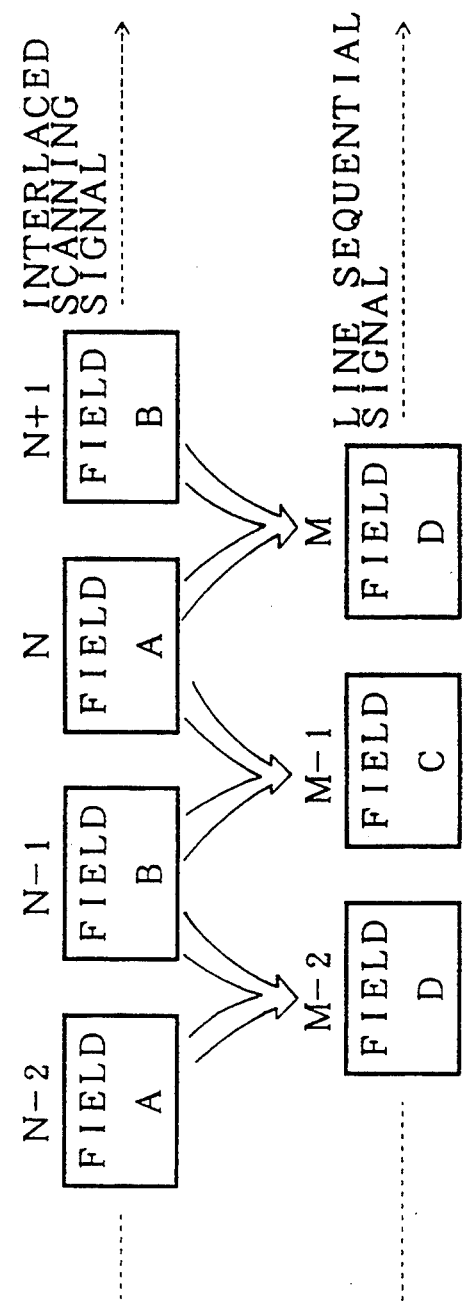

PRIOR ART
FIG. 16a
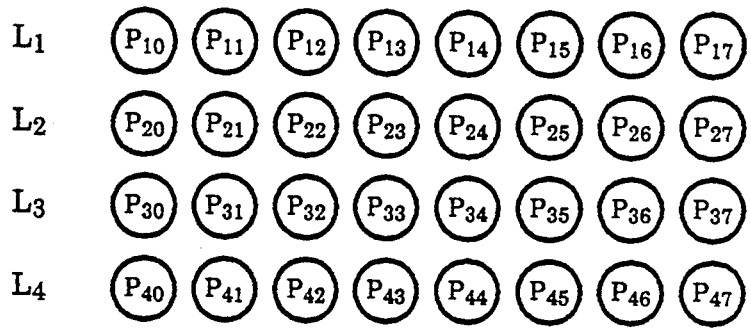
PRIOR ART
FIG. 16b
| K₄ | K₃ | K₄ |
|---|---|---|
| K₂ | K₁ | K₂ |
| K₄ | K₃ | K₄ |
PRIOR ART
FIG. 16c
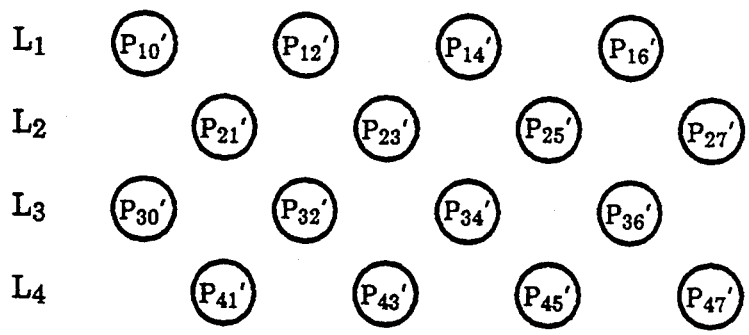
PRIOR ART
FIG. 16d
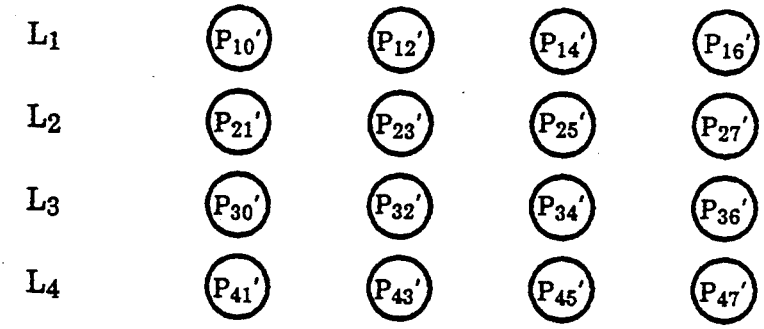

VIDEO SIGNAL SYSTEM CONVERTING CIRCUIT FOR PROCESSING VIDEO SIGNAL HAVING INTERLACED SCANNING LINES TO PRODUCE VIDEO SIGNAL HAVING SEQUENTIAL SCANNING LINES

This is a divisional of application Ser. No. 07/721,867 filed Jun. 26, 1991 now U.S. Pat. No. 5,305,112.

BACKGROUND OF THE INVENTION

1. Field of the Invention

This invention relates generally to a video signal recording and/or reproducing system for recording and/or reproducing a video signal with high quality, and specifically to a video-signal-system converting circuit for processing a video signal having interlaced scanning lines to produce a video signal having sequential scanning lines. The present invention also relates to a video signal subsampling circuit for offset-sampling a line sequential video signal within a frame to compress the amount of data as well as to a video signal interpolating circuit for interpolating the compressed video signal to recover the original video signal.

2. Prior Art

As large-screen television sets have become more common, visual characteristics such as flicker and blur of a picture have become noticeable. In order to solve a growing demand for improvement of picture quality, various high quality-picture television systems has been developed. Such television systems include the IDT-V(Improved Definition Television) system, the EDT-V(Extended Definition Television) and the HDTV(High Definition Television) system. The IDTV is intended to improve the vertical resolution of a picture through the use of sequential line scanning without the need for the improvement or change of existing systems. The EDTV system is intended to improve the vertical and horizontal resolutions by making necessary improvement in and modification to the existing system while maintaining the compatibility of the new system with the existing systems. The HDTV is completely independent of existing television systems, and is an ideal television system for the next generation. Some of the new television systems have been put into practical use in the television broadcasting. Meanwhile, the NTSC systems is still the only system being used in the package media such as a VTR and a VDP. The package media, particularly consumer package media, are behind the broadcasting in terms of improvement in picture quality.

One of the technologies for improving picture-quality is a conversion technique for converting interlaced scanning lines into progressive scanning lines. One such conversion technique is the intra-field/inter-field interpolation technique suitable for frequently moving pictures. This interpolation consists of the intra-field interpolation where the data of the preceding field are simply delayed so as to use the data as new scanning lines, and the inter-field interpolation where a new scanning line is produced by averaging the data of adjacent upper and lower scanning lines. With this type of interpolation, while a satisfactory picture can be obtained for a still picture, cross talk occurs to adversely affect picture quality when there is no correlation in moving a picture between fields, and a variation in vertical resolution occurs when a picture starts to slowly move and then stops. This is probably due to the fact that the moving portion of the picture is interpolated by averaging.

FIG. 15 shows one such conventional video signal subsampling circuit. Referring to FIG. 15, the subsampling circuit is adapted to offset sample (quincunx sampling) a video signal having sequential scanning lines within a frame so as to compress the amount of data of the video signal. In the figure, progressive scanning lines are inputted to an input terminal 510. A line memory 511 stores therein data of a length of "one line minus one picture element". A first and a second delay circuit 512 and 513 each store therein one picture element outputted from the line memory 511. A line memory 514 stores therein data of a length of "one line minus one picture element". A multiplying circuit 515 receives the signal from the input terminal and outputs a signal multiplied by a coefficient K3. The output of the memory 511 and the output of the delay circuit 513 are supplied to an adder 516 which outputs the sum of the two signals supplied thereto. A multiplying circuit 517 receives the signal from the adder 516 and outputs a signal multiplied by a coefficient K2. A multiplying circuit 518 receives the signal from the delay circuit 512 and outputs a signal multiplied by a coefficient K1. A multiplier 519 receives the output of the line memory 514 and outputs a signal multiplied by a coefficient K3. An adder 520 adds the outputs of the multipliers 515 and 517–519 and supplies the sum to a switch 521. The switch 520 is switched between a position a and a position b to selectively pass the output of the adder 520 and "zero" (i.e., ground) at a clock frequency of fs. The output of the switch 521 is supplied directly to a position a of a switch 523 and via a delay circuit 522 to a position b. The switch circuit 823 is switched between the positions a and b for every line(H) so as to output the thus subsampled video signal.

Progressive scanning lines as shown in FIG. 16a are inputted to the input terminal 10 in the order of L1 (picture elements P10, P11, . . . ), L2(P20, P21, . . . ), L3(picture elements P30, P31, . . . ), . . . etc. The video lines of "3 elements by 3 lines" are multiplied by coefficients K1–K4 in the form of a 3 by 3 matrix as shown in FIG. 16b, so that the picture element data are subsampled to produce a compressed-picture-element data on the basis of an element and its adjacent elements. Such data processing is effected line by line for every other elements in a line. For example, a compressed element P21' is calculated from picture elements of 3 by 3 (i.e., nine elements) P10–P12, P20–P22, and P30–P32 as follows:

$$P21' = K1 P21 + K2(P20+P22) + K3(P11+P31) + K4(-P10+P12+P30+P32)$$

Since the picture elements P22, P21, P20, and P11 are outputted from the line memory 511, delay circuits 512 and 513, and line memory 514, the picture element P21' is given by the following expression.

$$P21' = K1 P21 + K2(P20+P22) + K3(P11+P31)$$

In this manner, the video signal having progressive scanning lines are subjected to quincunx sampling within a frame, so that a total of five picture elements, four of which are aligned to diagonally surround a center element, are multiplied by a group of coefficients in the form of 3 by 3 matrix to produce a compressed picture element corresponding to the center element.

At the next clock, the switch 521 makes contact with terminal a which, and is grounded contact, so that the output data subsequent to P21' is zero as shown in FIG. 16c.

Then, the picture element data from the switch 521 are shifted one element to the left by the delay circuit so that they are aligned in vertical lines or columns as seen in FIG. 16d.

When demodulating the thus compressed video signal as shown in FIG. 17a, the data "zeros" are inserted between adjacent elements of the compressed data as shown in FIG. 17b such that a zero appears every other element in each line and between the zeros in the previous line. The data are then multiplied by coefficients in the form of a 3 by 3 matrix. FIG. 17c shows the calculation of a data matrix (P12', P21', P32' and P23') times a coefficient matrix (J1–J4) to produce a picture element data P22. Likewise, calculation is carried out for the data in respective lines. The coefficients J1–J4 are in a relation of Jn=2Kn. The above described conventional sampling and interpolating process is disadvantageous in that not only the respective circuits are required of high speed operation but also the memories for storing a length of picture element data must have a large storage capacity since the associated circuits must be operated with a sampling frequency of fs.

SUMMARY OF THE INVENTION

It is an object of the present invention to provide a novel video signal recording and/or reproducing system which ensures high quality recording and/or reproduction of a video signal in package media such as a VTR and a VDP.

Another object of the invention is to provide a video signal converting circuit of simple construction which converts an interlaced scanning video signal into a sequential scanning video signal.

A further object of the invention is to provide a video signal subsampling and/or interpolating circuit of a simplified circuit which requires the minimum operating speed of associated circuits and the minimum storage capacity of line memories.

A video signal recording and reproducing system according to the invention enables recording and reproducing of a video signal with high quality. The system includes a recording system for recording the video signal by means of a median filter on a record medium and a reproducing system for reproducing the video signal from the record medium. The recording system separates a brightness signal and a color signal from an interlaced scanning signal. The recording system divides picture elements of each line into two phases by sorting the elements such that an element is put into one phase and the next element into the other. The recording system then carries out two-dimensional subsampling to the brightness signal and the color signal to reduce the amount of data. Then, the recording system compresses and time-division multiplexes the brightness signal and the color signal to provide a video signal to be recorded onto a record medium. The reproducing system separates the brightness signal and the color signal from a video signal read out from the record medium, and then interpolates picture elements into the two signals to obtain sequential scanning RGB signals for 525 scanning lines.

BRIEF DESCRIPTION OF THE DRAWINGS

Features and other objects of the invention will be more apparent from the description of the preferred embodiments with reference to the accompanying drawings in which:

FIGS. 3a–3e are diagrammatic representations illustrating the operation of a vertical interpolating circuit of the video signal recording system converting circuit of FIG. 2;

FIGS. 16a–16d are diagrammatic representations illustrating the subsampling operation of the subsampling circuit of FIG. 15.

DESCRIPTION OF THE PREFERRED EMBODIMENTS

RECORDING SYSTEM

Figure 1:
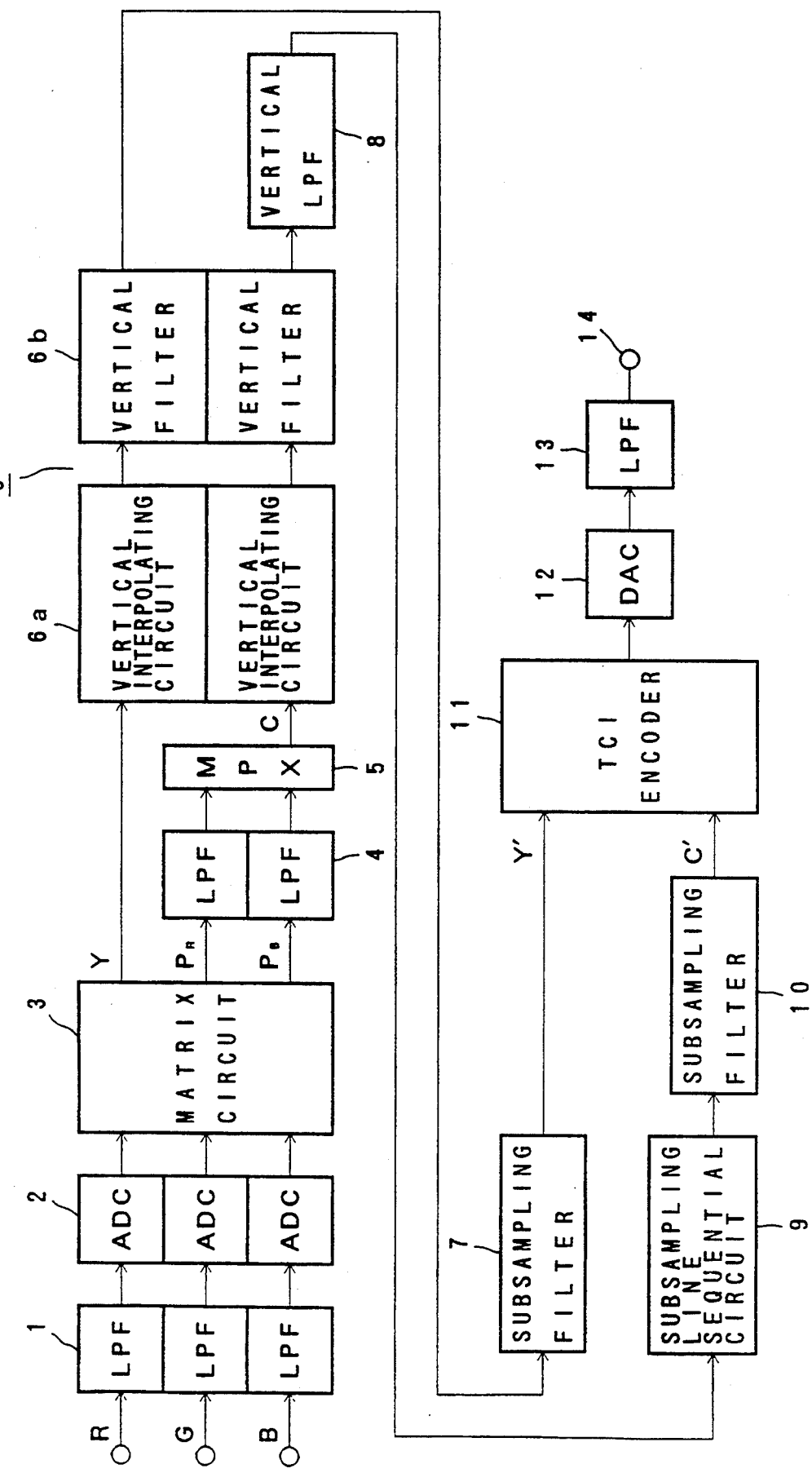
FIG. 1 is a block diagram of a video signal recording system according to the present invention.

FIG. 1 shows a recording system of a video signal recording and/or reproducing system according to the present invention. Component signals, R, G, and B of the high definition television system are band limited by low pass filters(LPF) 1 and are then converted into digital signals by A/D converters 2. The outputs of the converters 2 are then split by a matrix circuit 8 into a brightness signal Y and two color difference signals PR and PB. The thus separated two color difference signals PR and PB are band limited by low-pass filters 4 and are then dot-multiplexed by a multiplex (MPX) 8 into a color signal C line by line. The brightness signal Y and the color signal C produced in this manner are supplied to a video signal system converting circuit 8 composed of a pair of vertical interpolating circuits 6a and a pair of vertical filters 6b. The vertical interpolating circuit and the vertical filter converts the 1125 interlaced scanning lines of the high definition television into 525 progressive scanning lines. The vertical filter 6b subsamples the 1125 interlaced scanning lines into the 525 progressive scanning lines so as to reduce the amount of data outputted from the comparator 22 and outputs a brightness signal and a color signal. The brightness signal is supplied to a TCI encoder via a subsampling filter 7 while the color signal is supplied to the TCI encoder through a vertical low pass filter 8, a thinning/line sequential circuit 9, and a subsampling circuit 10. The TCI encoder receives the brightness signal Y' and a color signal C' and compresses the signals line by line in terms of time so as to time-division multiplex the signals. The output of the TCI encoder 11 is converted by a D/A converter 12 into an analog signal and is then supplied a low pass filter 13 where the signal is band limited. The signal is then outputted from an output terminal 14 to an external circuit such as magnetic tape recording circuit or optical disk recording circuit for video recording. Television Signal System Converting Circuit.

Figure 2:
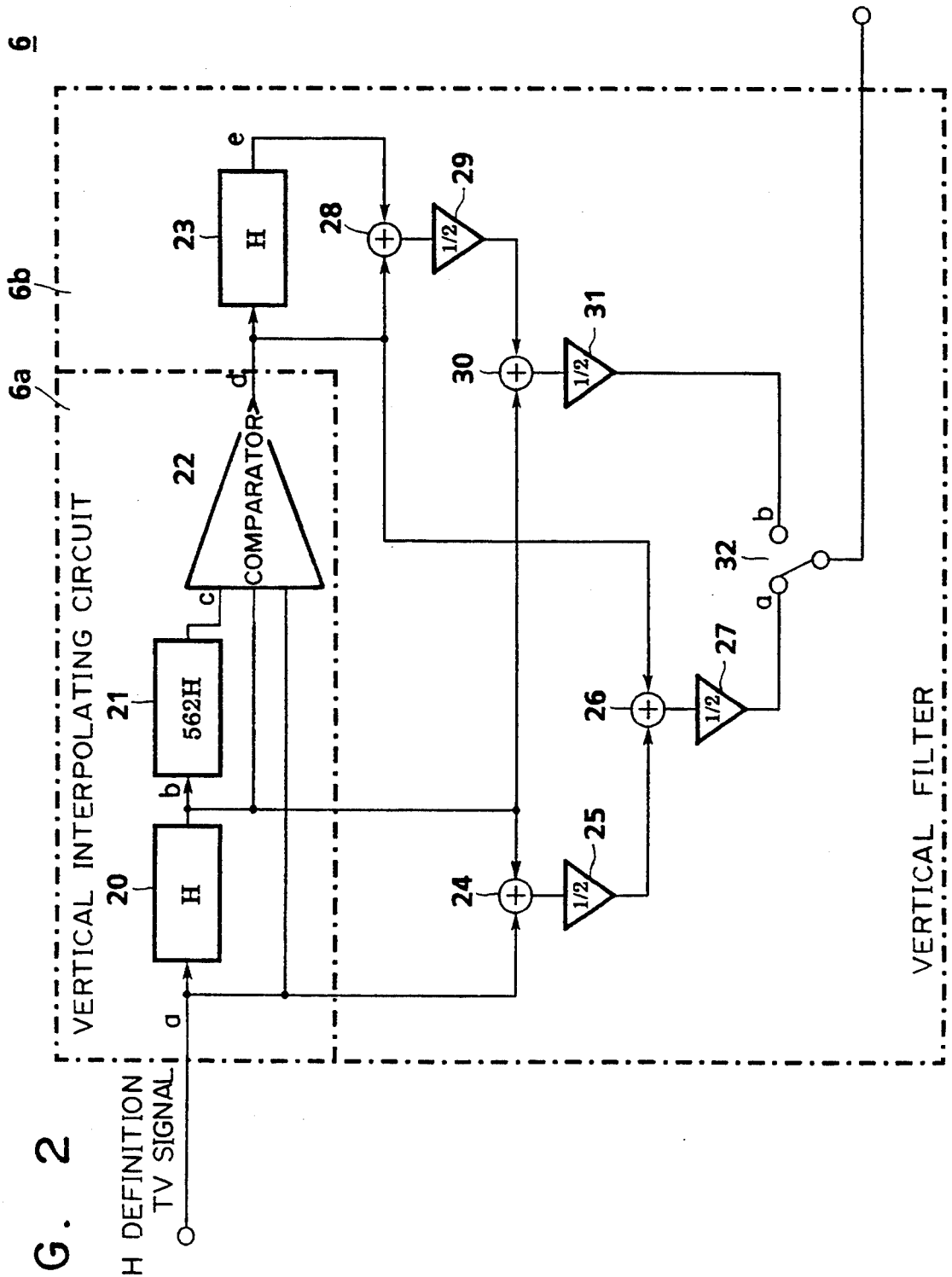
FIG. 2 is a block diagram showing a video signal system converting circuit of the video signal recording system of FIG. 1.

FIG. 2 shows a detailed construction of the vertical interpolating circuit 6a and vertical filter 6b. In the interpolating circuit 6a, a line memory 20 stores therein a horizontal scanning line of the high definition television. A field memory 21, which stores 562 scanning lines, is connected to the output of the line memory 20 and stores therein as many scanning lines as one field. These three signals a, b, and c are supplied to a comparator 22. The comparator 22 outputs a picture element having a median value of the three signals a, b, and c so as to convert 1125 interlaced scanning lines into 1125 progressive scanning lines. The median filter is advantageous in that it presents less blurring at the edge of a picture and is immune to noise as compared to a conventional local-averaging circuit.

The vertical filter 6b subsamples each of the 1125 progressive scanning lines and deletes upper and lower extra lines to provide 525 progressive scanning lines. In the vertical filter 6b, a line memory 23 is connected with the output of the comparator 22 and stores as many picture elements as one complete line. An adder 24 adds the signals a and b, and an adder 28 adds the signal d and e and outputs the sum to a multiplier 29. An adder 30 adds the signal b and the output of the multiplier 29 and outputs the sum to a multiplier 31. A multiplier 25 outputs the output of adder 24 multiplied by $\frac{1}{2}$ to an adder 26, which in turn outputs the sum of the output of multiplier 25 and the signal d. A multiplier 31 receives the output of adder 30 and outputs a signal multiplied by $\frac{1}{2}$ to a switch 32. The switch 32 receives the output of an adder 26 via an multiplier 27 and is driven to switch between contacts a and b for each field.

Figure 3A:
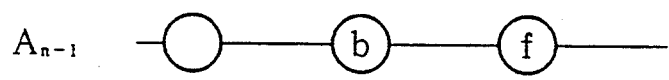
Figure 3A:
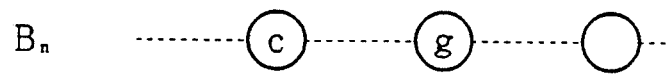
Figure 3A:
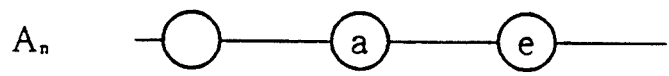
Figure 3A:
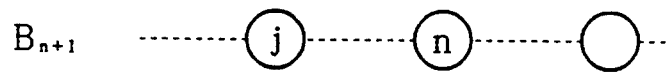
Figure 3A:
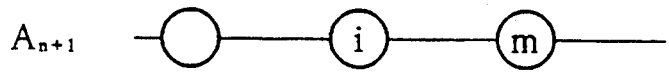
Figure 3A:

The high definition television signal is in the form of an interlaced scanning line where a first field A alternates with a second field B as shown in FIG. 3e.

When the switch 32 is switched to the position a and a picture element a of an Nth line An of a high definition television signal is inputted, the comparator 22 selects an element having a median value of color density out of three picture elements a, b of the preceding line An−1 outputted from the line memory 20, and c of a line Bn of the (N−1)th field outputted from the field memory 21. The median data is outputted from the comparator 22 as a picture element d. The interpolated data d is then stored into a one-line memory 23. When the lines of the Nth field are being inputted, the switch 32 outputs a new picture element d' having a color density Sd', which is a weighted sum of density values Sa, Sb, and Sd of picture elements a b and c as follows:

$Sd' = Sd/2 + Sa/4 + Sb/4$

When a picture element e is inputted to the vertical interpolating circuit 6a, just as d is interpolated, the comparator 22 selects an element having a median value of color density out of three picture elements e, f of the preceding line An−1, and g of a line Bn of the (N−1)th field. The median data is outputted as a picture element h. The interpolated data h is then stored into the one-line memory 23. Then, the switch 32 outputs a new picture element h' having a color density Sh', which is a weighted sum of density values Se, Sh, and Sf of picture elements h, and f.

$Sh' = Sh/2 + Se/4 + Sf/4$

Figure 3B:
Figure 3B:
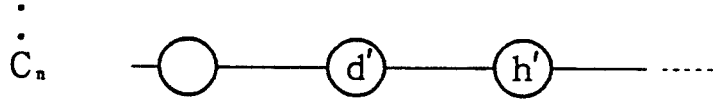
Figure 3B:

Likewise, the calculation is repeated for each picture element of the line An to produce a line Cn as shown in FIG. 3b.

When a picture element i of a (An+1)th line is inputted to the vertical interpolating circuit 6a, just as the picture element d is calculated, a new picture element k' is calculated on the basis of the picture elements i, j, and a which produce $Sk' = Sk/2 + Si/4 + Sa/4$. In this manner, the calculation is repeated for each line inputted so as to produce 1125/2 progressive scanning lines, C1, . . . Cn, Cn+1, . . . C525.

Figure 3C:
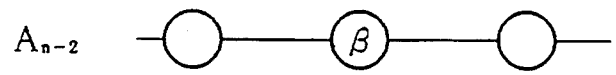
Figure 3C:
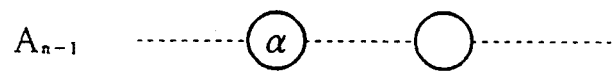
Figure 3C:
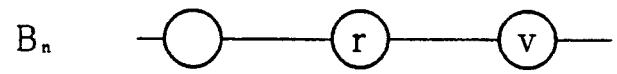
Figure 3C:
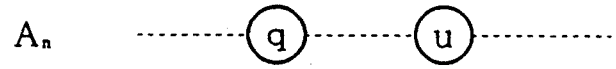
Figure 3C:
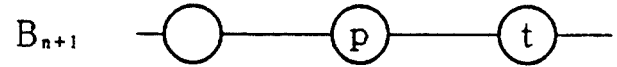
Figure 3C:
Figure 3C:
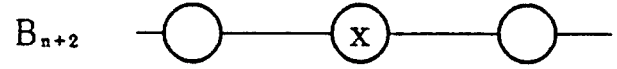
Figure 3C:
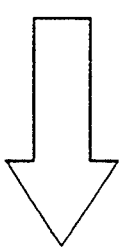
Figure 3D:
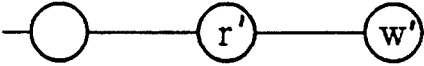
Figure 3D:

When the calculation for the Nth field has been completed, the switch 32 is switched to the position b. As shown in FIG. 3c, when a picture element R of a line Bn+1 of (N+1)th field is inputted, the comparator 22 selects an element having a median value of color density out of three picture elements R, E of the preceding line Bn outputted from the line memory 20, and q of a line An of the Nth field outputted from the field memory 21. The median data is outputted as a picture element s. The thus interpolated data s is then stored into the one-line memory 23. When the lines of the Nth field are being inputted, the switch 32 outputs a new picture element r' having a color density Sr', which is a weighted sum of density values Sr, Ss, and Sγ of picture elements r, s, and γ

$Sr' = Sr/2 + Ss/4 + S\gamma/4$ where the picture element γ is an interpolated element that has been previously calculated on the basis of elements β and γ in a line An−1, and the element r in the (N+1)th line Bn.

When a picture element t of a line Bn+1 of (N+1)th field is inputted into the vertical interpolating circuit 6a, the comparator 22 selects an element having a median value of color density out of three picture elements t and v of the preceding line Bn outputted from the line memory 20, and u of a line An of the Nth field outputted from the field memory 21. The median data is outputted as a picture element w. The interpolated data w is then stored into the one-line memory 23. When the lines of the Nth field are being inputted, the switch 32 outputs a new picture element w' having a color density Sw' = Sw/2 + St/4 + Sv/4, which is a weighted sum of density values St, Su, and Sv of picture elements t, u, and v. Thus, a line Dn+1 as shown in FIG. 3 is produced by repeating the above calculation for each picture element of the line Bn+1.

When a picture element x of a line Bn+2 is inputted to the vertical interpolating circuit 6a, just as p is interpolated, a new picture element z' having a density Sz' is calculated on the basis of picture elements x, y, and p. Thus, the above calculation is done for each picture element of the line Bn+2 to produced a line Dn+2 as shown in FIG. 3. In this manner, the calculation is repeated one after another to produce 1125/2 progressive scanning lines, D1, . . . Dn, . . . Dn+1, . . . D525.

The progressive scanning lines thus produced are deleted including upper and lower extra lines to provide 525 scanning lines per frame. This video signal can be displayed on a screen of the EDTV system having a wide aspect ratio.

Subsampling Circuit for Color Signal

Figure 6C:
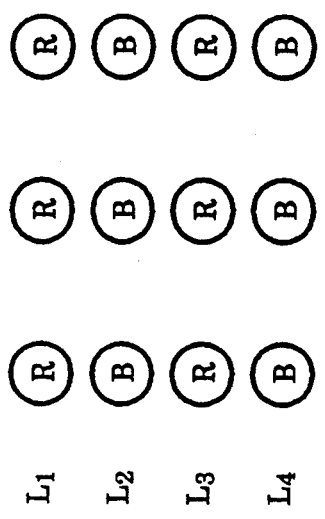
FIGS. 6a–6e are diagrammatic representations illustrating the color signal subsampling/line-sequential operation of the video signal recording system of FIG. 1.
Figures 6D, 6E:
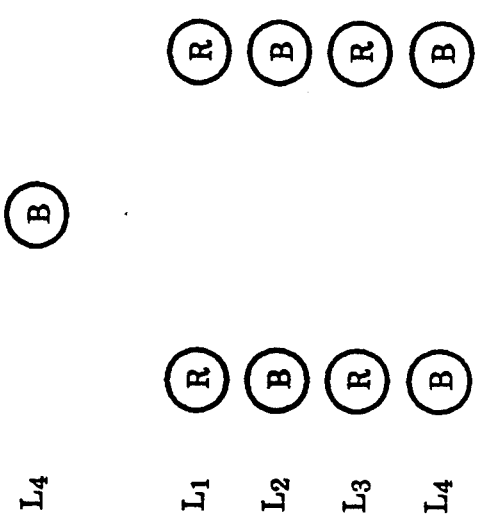
Figure 6A:
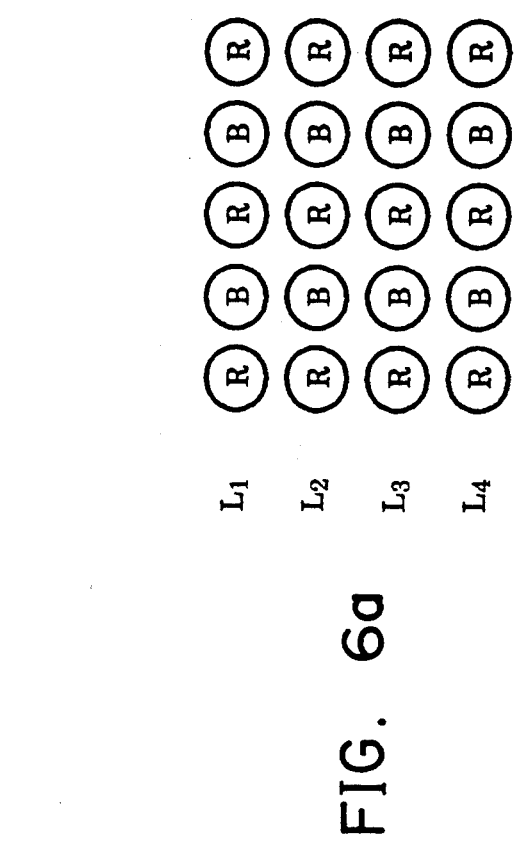
Figure 6B:
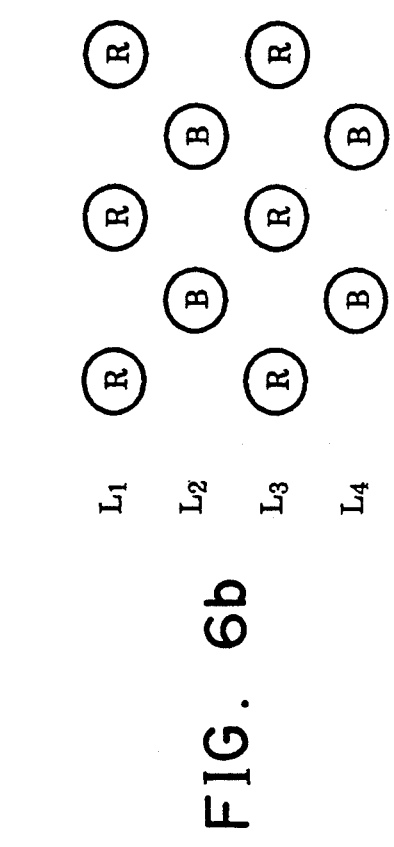

The color signals C' outputted from the video signal system converting circuit 6 are dot-multiplexed line by line and are band limited by a vertical low pass filter 8. The thinning/line sequential circuit 9 subsamples each line of the color signal to thin out every other picture element as shown in FIG. 6b. The color signal in FIG. 6b is then shifted to the left every other line so that the picture elements are aligned vertically as shown in FIG. 6c before being inputted to the subsampling filter 10. The subsampling filter 10 removes aliasing distortion, then thins out each line every other element as shown in FIG. 6d, and then aligns the picture elements vertically as shown in FIG. 6e to output a subsampled color signal C'. The brightness signal and color signal which have been reduced, are compressed line by line in terms of time, and are then time-division multiplexed before being recorded onto a recording medium such as a laser disk.

REPRODUCING SYSTEM

Figure 7:
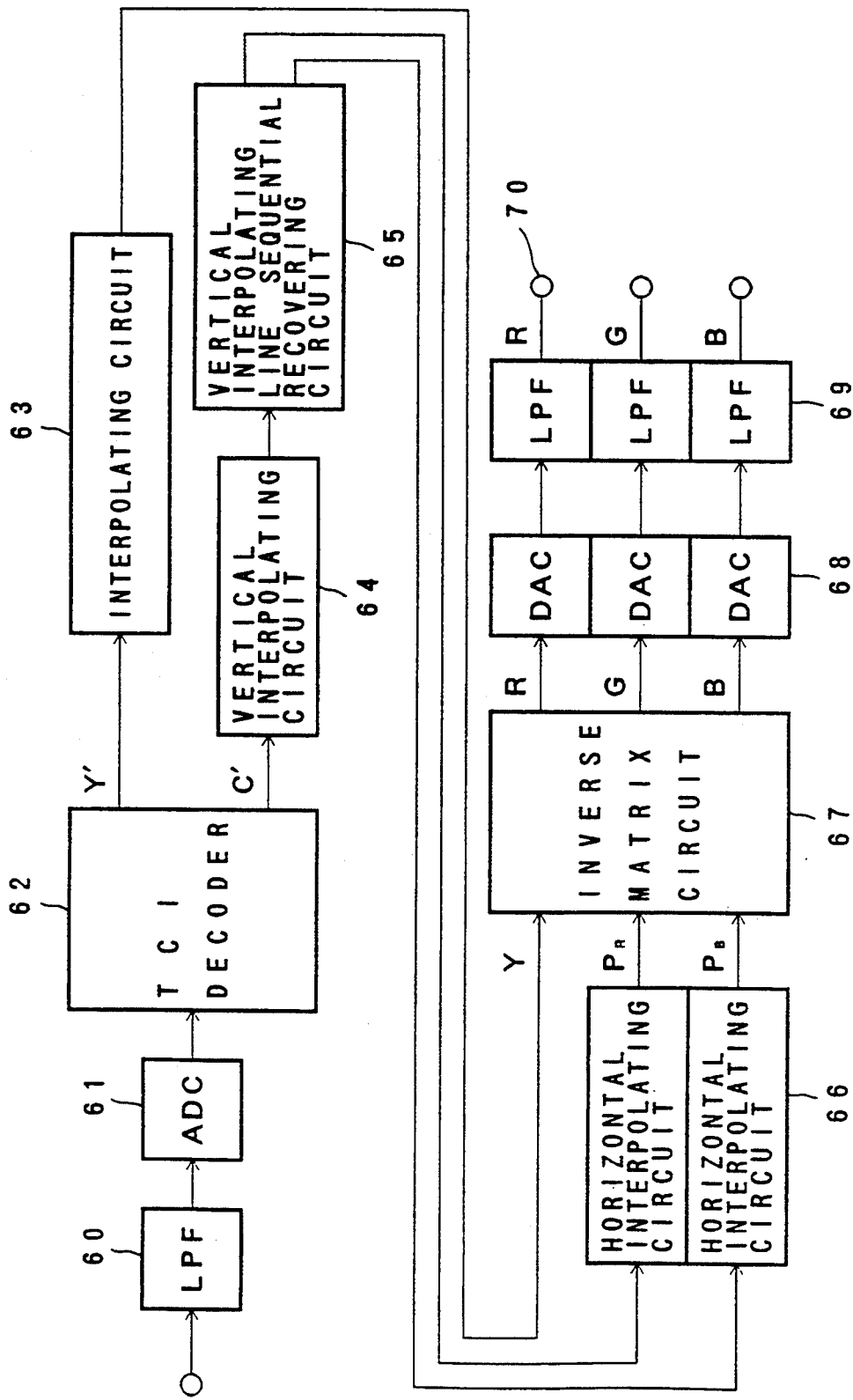
FIG. 7 is the block diagram of a video signal reproducing system according to the present invention.

FIG. 7 shows a reproducing system of the video signal recording and/or reproducing system to which the present invention is applied.

Figure 10A:
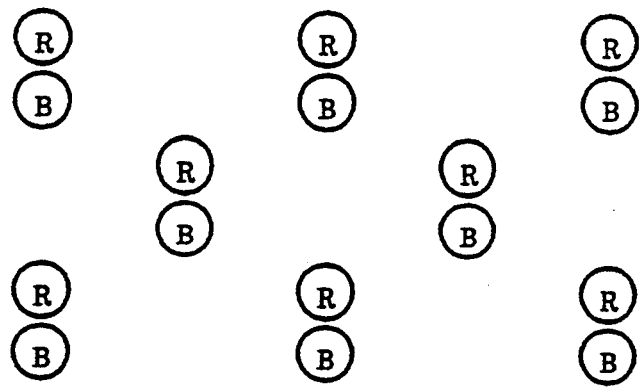
FIGS. 10a–10d are diagrammatic representations illustrating color signal interpolating operation of the video signal reproducing system.
Figure 10B:
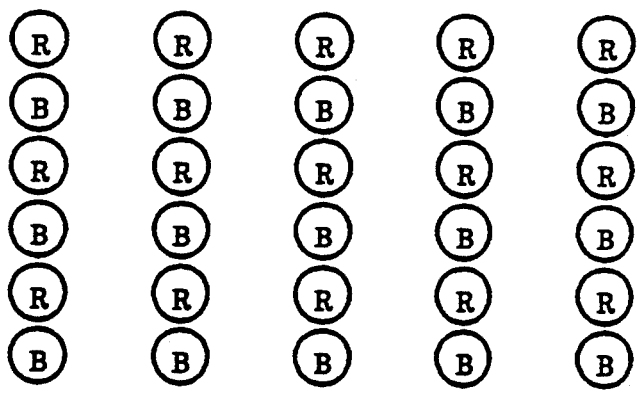
Figure 10C:
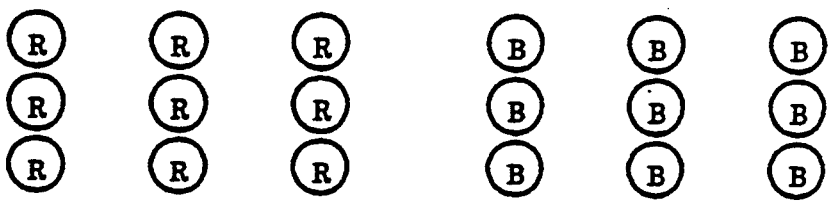
Figure 10D:
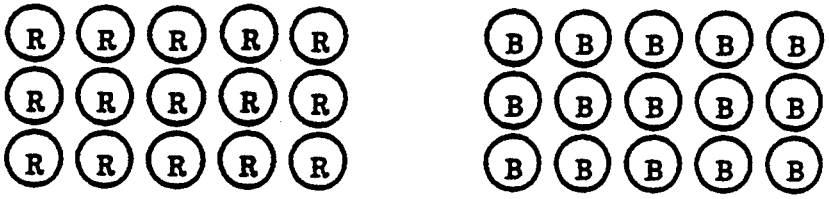

A video signal recorded on a record medium such as a video tape or a laser disk by the aforementioned recording system is read out by a magnetic tape reproducing circuit or an optical disk reproducing circuit (not shown). The video signal thus read out is band limited by a low-pass filter 60 and is then converted into a digital signal by an A/D converter 61. The digital signal is inputted to a TCI decoder 62. In the TCI decoder 62, the time-multiplexed brightness signal Y' and color signal C' of each line are separated and are then expanded in terms of time. The brightness signal Y' is supplied to an interpolating circuit 63, which interpolates the data that have been thinned out during recording operation thereof. The color signal C' is supplied to a vertical interpolating circuit 64 which inserts "zero data" to the color signal C' as shown in FIG. 10a and then interpolates picture elements in columns as shown in FIG. 10b. The output of the vertical interpolating circuit 64 is supplied to a vertical interpolating/line sequential recovery circuit 65 which recovers picture elements before thinning as well as vertically interpolates the recovered picture elements to produce the picture elements as shown in FIG. 10c. Then, horizontal interpolating circuit 66 performs the horizontal interpolation of each of the two color signals C' to produce two color difference signals PR and PB. A reverse matrix circuit 67 converts the brightness signal Y and color difference signals PR and PB into three primary color signals R, G, B which are then converted into analog signals by a D/A converter 68. The output of the D/A converter 68 is band limited by a low pass filter 69 and is then outputted to an output terminal 70. Component signals R, G, and B are outputted which have 525 progressive scanning lines, an aspect ratio of 16:9, and a frame frequency of 60 Hz. The component signals can be displayed on an EDTV television set for high quality reproduction of a video signal.

FIRST EMBODIMENT OF SUBSAMPLING FILTER/INTERPOLATING CIRCUIT

Subsampling Filter

Figure 4:
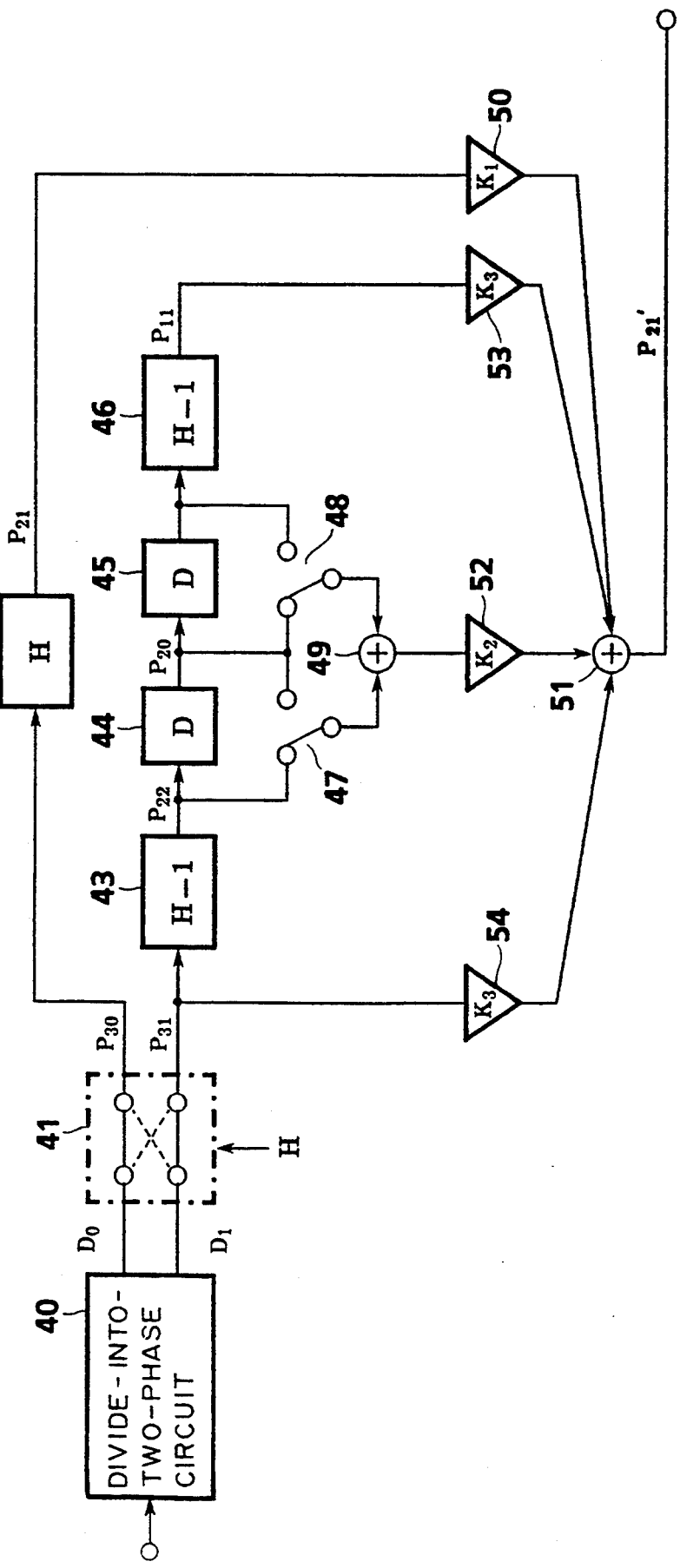
FIG. 4 is the block diagram of a subsampling circuit or filter circuit of the video signal recording system of FIG. 1.

FIG. 4 shows the construction of the subsampling filter 7. The subsampling filter subsamples the output of the video signal system converting circuit 6 by multiplying 3 lines×3 picture elements in the output by coefficients in the form of 3×8 matrix, thus reducing the amount of data.

In the figure, a divide-into-two-phase circuit 40 divides the picture elements of each line into two phases by sorting the elements such that an element is put into one phase and the next element into the other. The two-phase data are supplied to the succeeding circuits through a switch 41 which interchanges the signal paths of the two phases line by line. One output of the switch 41 is supplied to a line memory 42 which stores as many picture elements as one complete line, and the other output is supplied to a line memory 48 which stores as many picture elements as "one line minus one element" and to a multiplier 54 which outputs a signal multiplied by a coefficient KS. The output of the line memory 48 is directed to cascaded delay circuits 44 and 45, each of which stores one picture element therein. The output of delay circuit 45 is supplied to a line memory 46 which stores as many picture elements as "one line minus one element". The input and output of the delay circuit 44 are directed to an adder 49 via a switch 47 which is switched between two contacts for every line. Likewise, the input and output of the delay circuit 45 are directed to the adder 49 via a switch 48 which is switched between two contacts for every line. The adder 49 adds the outputs of switches 47 and 48 and supplies the sum to a multiplier 52 which in turn outputs a signal multiplied by a coefficient K2 to an adder 51. The adder 81 receives the outputs of multipliers 50, 53, 54, and 52 to output a sum.

The circuit in FIG. 4 receives the 525 progressive scanning lines in the form of a line L1(picture element P10, P11 . . .), L2(picture element P20, P21, . . .), L3(picture element P30, P31, . . .), . . . as shown in FIG. 5. The divide-into-two-phase circuit 40 receives the picture elements of each line at a timing of fs and divides them into a two-phase signal as shown in FIGS. 5b and 5c so as to output the two-phase data at a timing of fs/2. Thus, the divide-into-two-phase circuit 40 outputs a signal D0 having a line La1(picture element P10, P12, . . .), La2(picture element P20, P22, . . .), La3(picture P31, P32, . . .), . . . and a signal D1 having a line Lb1(picture element P11, P13, . . .), Lb2(picture element P21, P23, . . .), Lb3(picture element P31, P33, . . .). Arrows in FIGS. 5a–5d indicate clock pulses. The signal path of signals D0 and D1 are interchanged for each line by the switch 41, so that the line memory 42 is supplied with the lines La1–Lb2–La3–Lb4 . . . while the line memory 43 is supplied with the lines Lb1–La2–Lb3–La4 . . . .

When a picture element P30 is supplied from the switch 41 to the line memory 42 and a picture element P31 is supplied to the line memory 43, a picture element P21 is outputted from the line memory 42, a picture element P22 from the line memory 43, a picture element P20 from the delay circuit 44, and a picture element P11 from the line memory 46. At this time, the switches 47 and 48 are positioned as shown in FIG. 4. The adder 51 outputs a subsampled picture element P21' as follow:

$$P21' = K1\ P21 + K2(P20 + P22) + K3(P11 + P31)$$

When a picture element P32 is supplied from the switch 41 to the line memory 42 and a picture element P33 is supplied to the line memory 43, a picture element P23 is outputted from the line memory 42, a picture element P24 from the line memory 43, a picture element P22 from the delay circuit 44, and a picture element P13 from the line memory 46. The adder 51 outputs a subsampled picture element P23' as follows:

$$P23' = K1\ P23 + K2(P22 + P24) + K3(P13 + P33)$$

Figure 5A:
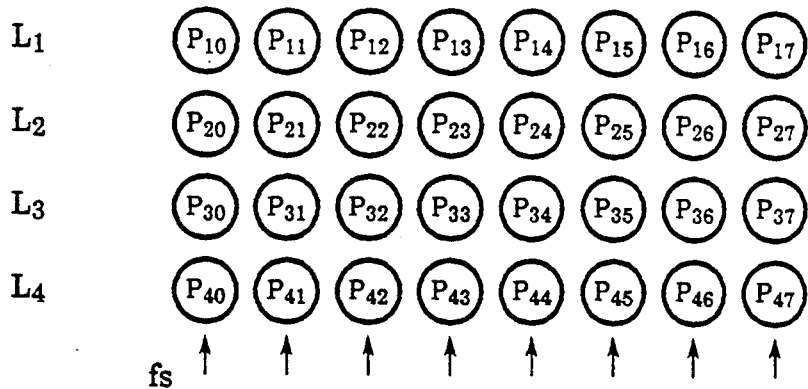
FIGS. 5a–5d are diagrammatic representations illustrating the brightness signal subsampling operation of the subsampling filter of FIG. 4.
Figure 5B:
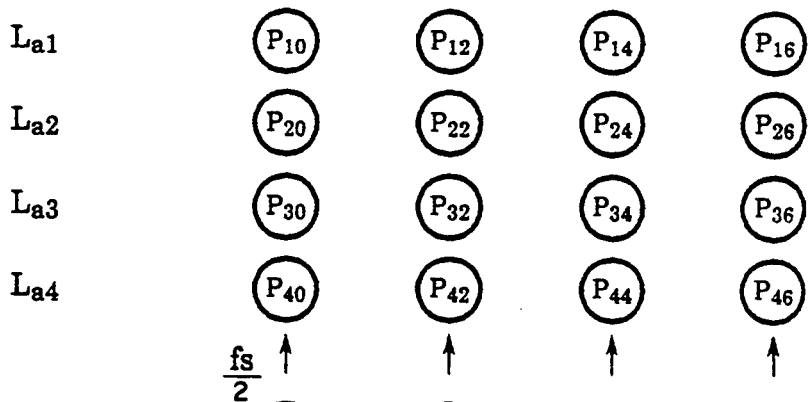
Figure 5C:
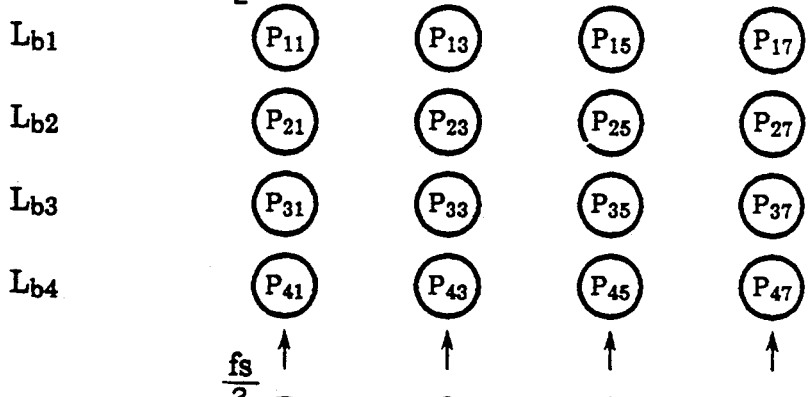
Figure 5D:
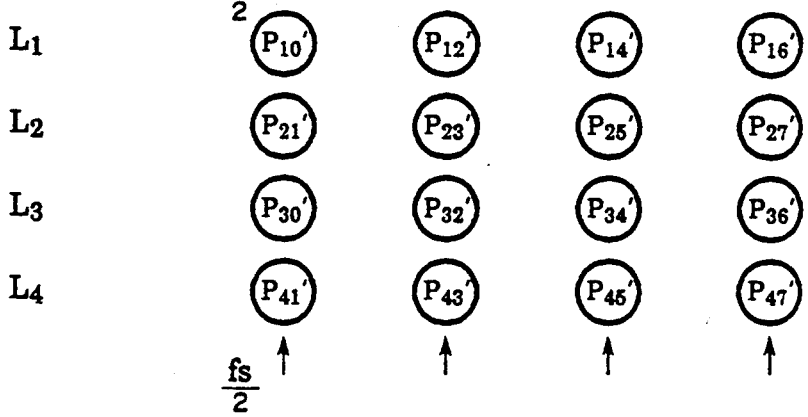

Likewise, calculation is performed to produce a line L2 as shown in FIG. 5d.

When a line L4 in FIG. 5a is inputted to the circuit, the switches 47 and 48 have been switched to the positions opposite to those shown in FIG. 4. When a picture element P40 and P41 are supplied, a subsampled picture element P30' is calculated as follows:

$$P30' = K1P30 + K2(\text{zero} + P31) + K3(P20 + P40)$$

Likewise, when picture elements P42 and P43 are inputted, a subsampled picture element P32' is calculated as follows:

$$P32' = K1P32 + K2(P31 + P33) + K3(P22 + P42)$$

when picture elements P42 and P43 are supplied, a subsampled picture elements P34' is calculated as follows:

$$P34' = K1P34 + K2(P33 + P35) + K3(P24 + P44)$$

In this manner, subsampling is performed for every other picture element of the respective lines as shown in FIG. 5d while at the same time the respective subsampled picture elements are aligned vertically to be subsequently outputted as a brightness signal Y'. It should be noted that each picture element in FIG. 5d contains part of information of picture elements in FIG. 5a.

Interpolating Circuit

Figure 8:
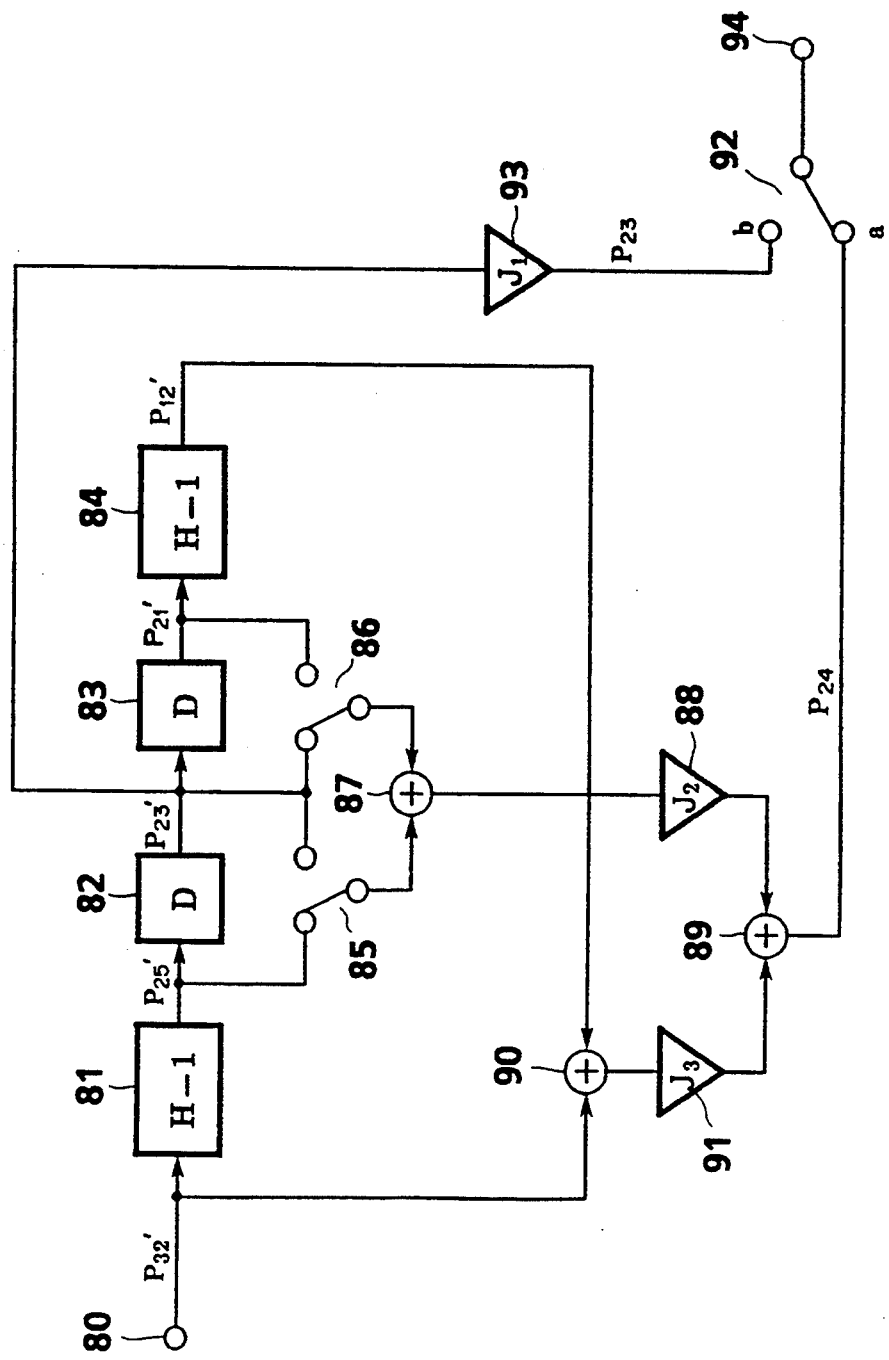
FIG. 8 is the block diagram of an interpolating circuit of the video signal reproducing system of FIG. 7.

FIG. 8 shows the detail of the interpolating circuit 63. The interpolating circuit 63 performs the multiplication of coefficients and the brightness signal Y' outputted from the TCI decoder 62 so as to recover the lost picture elements when thinned in such a way that each group of picture elements of "3 lines by 3 picture elements" is multiplied by coefficients in the form of a matrix of 3×3.

In the figure, a signal supplied to an input terminal 80 is directed to a line memory 81 which stores picture elements of a length of "one line minus one picture element." The output of the line memory 81 is directed to delay circuits 82 and 83, each of which stores one picture element. The output of delay circuit 83 is inputted to the line memory 84 which stores picture elements of a length of "one line minus one picture element." The input and output of the delay circuit 82 are supplied to a switch 85 which switches between two contacts for every line so as to selectively output the signals supplied thereto. The output of the delay circuit 82 is also supplied to a multiplier 93 which multiplies the signal by a coefficient J1. An adder 87 adds the outputs of switches 85 and 86 and supplies the sum to an adder 89. The adder 90 adds the input of line memory 81 and the output of line memory 84 and supplies the sum to a multiplier 91 which in turn multiplies the sum by a coefficient J3. The output of adder 89 is supplied to a contact a of a switch 92 and the output of multiplier 93 to a contact b. The switch 92 is switched at a clock frequency of fs.

The interpolating circuit 63 receives at the input terminal 80 from the TCI decoder 62 the 525 progressive scanning lines of L1(P10', P12', ...) L2(P21', P23', ...), L3(P30, P32, ...), ... etc. When a picture element P32' is inputted to the line memory 81, a picture element P25' is outputted from the line memory 81, a picture element P23' from the delay circuit 82, a picture element P21' from the delay circuit 83, and a picture element P12' from the line memory 84. At this time, the switches 85 and 86 are positioned as shown in FIG. 8 and the switch 92 is positioned at the contact b. Thus, the switch 92 outputs a picture element P23 as follows:

$$P23 = J1\ P23'$$

Then, the switch 92 is switched to the position a and the switch 92 outputs a picture element P22 as follows:

$$P24 = J2(P23' + P25') + J3(P12' + P32')$$

Likewise, when a picture element P43' is inputted to the line memory 81, a picture element P34' is outputted from the line memory 81, a picture element P32' from the delay circuit 82, a picture element P30' from the delay circuit 83, and a picture element P23' from the line memory 84. At this time, the switches 85 and 86 are switched to the positions opposite to those shown in FIG. 8 and the switch 92 is positioned at the contact a. Thus, the switch 92 outputs a picture element P31 as follows:

$$P31 = J2(P30' + P32') + J3(P43' + P23')$$

Then, the switch 92 is switched to the position b and the switch 92 outputs a picture element P32 as follows:

$$P32 = J1\ P32'$$

Figure 9A:
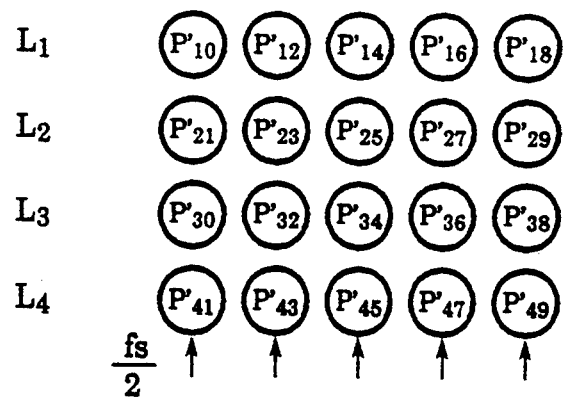
FIG. 9a and 9b are diagrammatic representations illustrating the brightness signal interpolating operation of the interpolating circuit of FIG. 8.
Figure 9B:
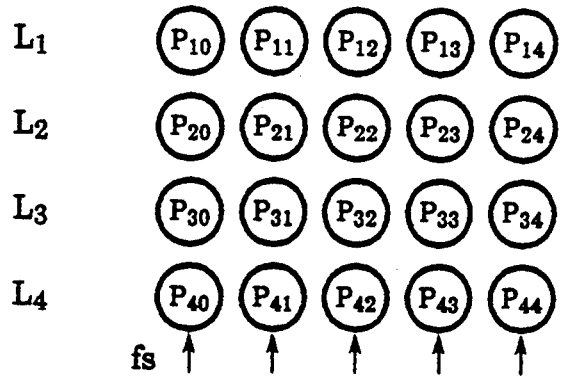

Repeating the above-described procedure recovers a brightness signal Y having 525 scanning lines as shown in FIG. 9b. The coefficients Jn and Kn are in a relation Jn=2Kn.

SECOND EMBODIMENT OF SUBSAMPLING FILTER/INTERPOLATING CIRCUIT

Subsampling Filter

Figure 11:
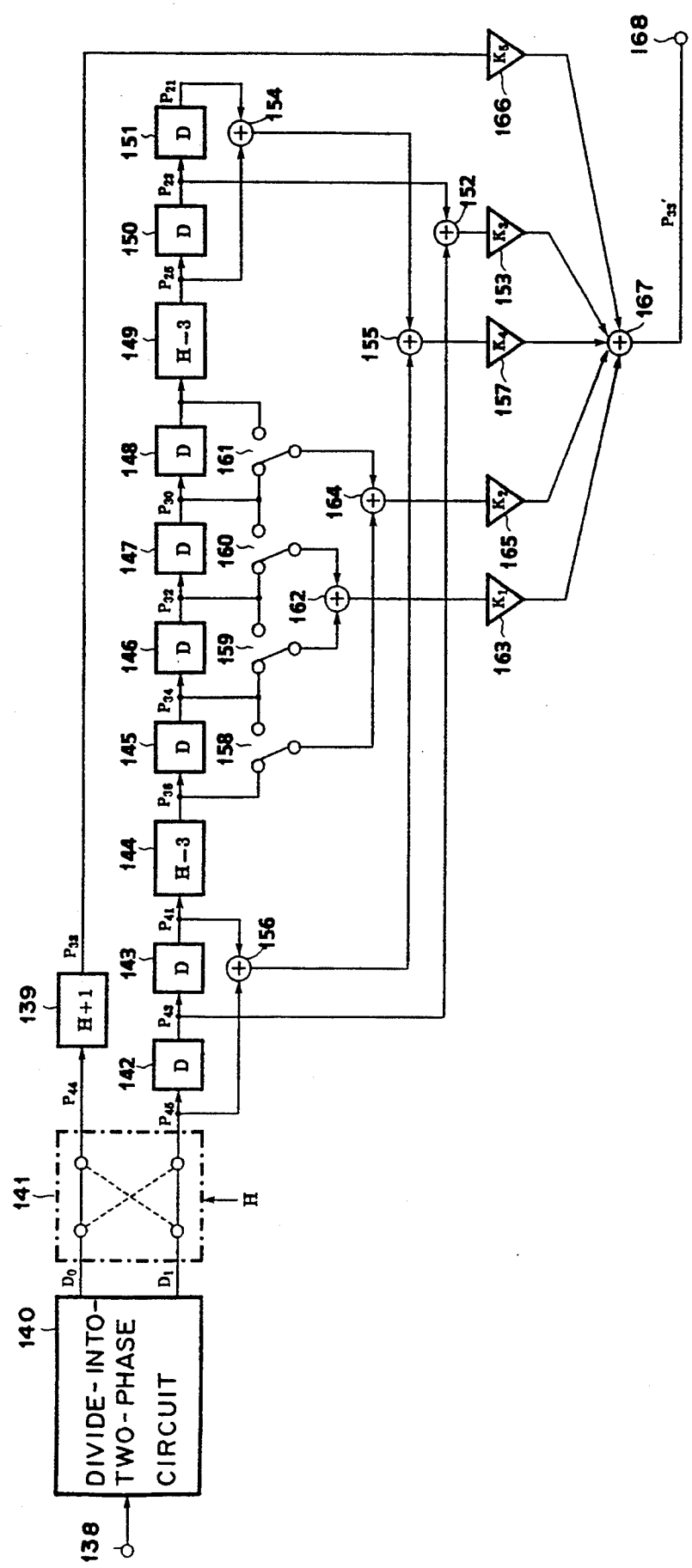
FIG. 11 is a block diagram showing another subsampling circuit of the recording system.

FIG. 11 shows a second embodiment of a subsampling circuit 7 according to the present invention. The video signal subsampling circuit shown includes a divide-into-two-phase circuit 140 and a switch 141 which are similar to-the circuits 40 and 41 of the subsampling circuit shown in FIG. 4. One output of the switch 141 is inputted to a line memory 139 which stores therein as many picture elements as "one line plus one picture element". A multiplier 166 multiplies the output of the line memory 139 by a coefficient K5 and outputs it to an adder 167. The other output of the switch 141 is inputted to delay circuits 142 and 143, and the output of delay circuit 143 is inputted to a line memory 144 which stores therein as many picture elements as "one line minus three picture elements." The output of the line memory 144 is inputted to cascaded delay circuits 145-148 and is then fed to another line memory 149 which stores therein as many picture elements as "one line minus three picture elements." Further, the output of line memory 149 is inputted to cascaded delay circuits 150 and 151. An adder 152 adds the output of delay circuit 150 to the output of delay circuit 142 and supplies the sum to a multiplier 153 which outputs the sum multiplied by a coefficient K3. Meanwhile, the adder 154 adds the output of line memory 149 to the output of delay circuit 151 and supplies the sum to another adder 155. An adder 156 outputs the sum of the input to the delay circuit 142 and the output of delay circuit 143 to the adder 155. The output of adder 155 is inputted to a multiplier 157 which outputs a signal multiplied by a coefficient K4.

Switches 158-161 are switched for each line between two contacts such that the outputs of line memory 145 and delay circuits 146 are supplied to the adder 162 and the outputs of delay circuits 144 and 147 are supplied to the adder 164 when the switches 158-161 is positioned as shown in FIG. 11, and the outputs of the delay circuits 146 and 147 are supplied to the adder 162 and the outputs of delay circuit 145 and 148 are supplied to the adder 164 when the switches 158-161 are positioned oppositely to those shown in FIG. 11. An adder 162 adds the outputs of switches 159 and 160 and then supplies the sum to a multiplier 163, which outputs a signal multiplied by a coefficient K1. Meanwhile, another adder 164 adds the outputs of switches 158 and 161 to output the sum to another multiplying circuit 165 which in turn outputs a signal multiplied by a coefficient K2. Then, an adder 167 outputs the sum of the outputs of the multipliers 153, 157, 163, 165, 166 to an external circuit via an output terminal 168.

When a picture element P44 is inputted to the line memory 139 while at the same time another picture element P45 is inputted to the delay circuit 142, then a picture element P33' is calculated in accordance with the following expression by the adding circuit 167 and is then outputted therefrom:

$$P33' = K1(P32 + P34) + \\ K2(P30 + P36) + \\ K3(P23 + P43) + \\ K4(P21 + P25 + P41 + P45) + \\ K5P33$$

Interpolating Circuit

Figure 12:
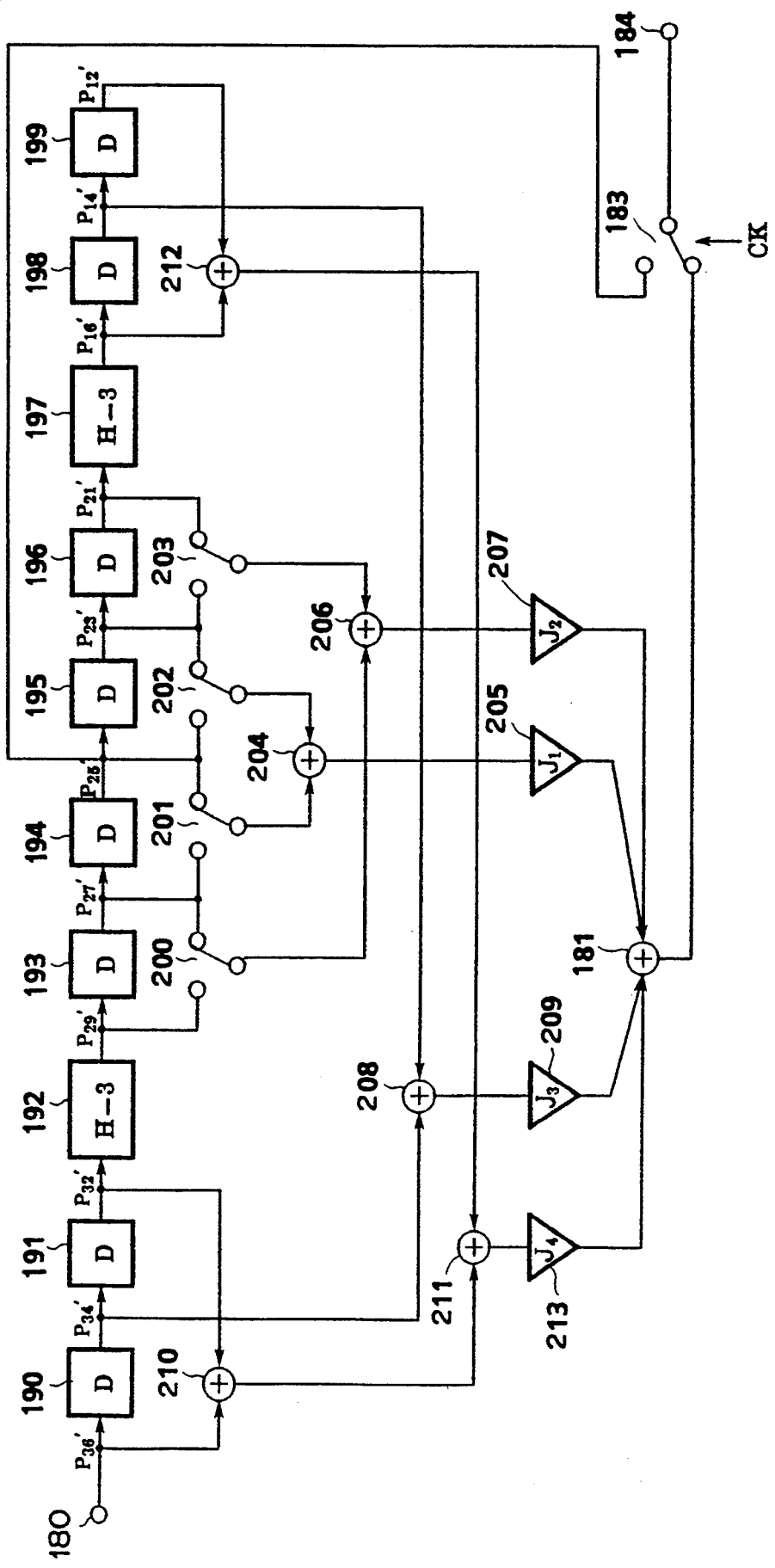
FIG. 12 is a block diagram showing another interpolating circuit of the reproducing system.

FIG. 12 shows another form of video signal interpolating circuit according to the invention. The video signal interpolating circuit recovers the original video signal from the previously compressed video signal provided by the circuit in FIG. 11. Delay circuits 190 and 191 each store therein one picture element. A line memory 192 receives the output of the delay circuit 191 and stores therein as many picture elements as "one line minus three picture elements." The output of line memory 192 is directed to cascaded four delay circuits 193-196, so that each delay circuit receives one picture element from the preceding circuit and transfers the element to the following circuit. A line memory 197 receives the output of delay circuit 196 and stores as many picture elements as "one line minus three picture elements." The output of the line memory 197 is supplied to a delay circuit 198 which in turn transfers the picture element therein to a delay circuit 199.

Switches 200-203 are switched for each line. When the switches 200-203 are switched to positions shown in FIG. 12, an adder 204 outputs the sum of the inputs to the delay circuits 195 and 196 while an adder 206 outputs the sum of the inputs to the delay circuits 194 and 197. A multiplier 205 outputs the output of adder 204 multiplied by a coefficient J1 while a multiplier 207 outputs the output of adder 206 multiplied by a coefficient J2. An adder 210 outputs the sum of the inputs to the delay circuit 190 and 192. An adder 208 outputs the sum of the inputs to the delay circuit 191 and 199, which sum is multiplied by a coefficient J3. An adder 212 outputs the sum of the outputs of the line memory 197 and the delay circuit 199. An adder 211 outputs the sum of the outputs of adders 210 and 212, which sum is multiplied by a multiplier 213 by a coefficient J4. An adder 181 receives the outputs of multipliers 213, 209, 205, and 207 to output the sum of the received signals to a switch 183. The switch 183 also receives the output of the delay circuit 194. The switch 183 is switched at a clock frequency of fs by the clock between the two contacts so as to selectively output the signals supplied thereto.

When a picture element P36' of a line L4 in FIG. 9a is supplied to the interpolating circuit in FIG. 12, a picture element P24 is calculated as follows:

$$P24 = J1(P23' + P25') + \\ J2(P21' + P27') + \\ J3(P14' + P34') + \\ J4(P12' + P16' + P32' + P36')$$

Then, the switch 183 is switched to the position opposite to that shown in FIG. 12 and the switch 183 outputs a picture element P25.

THIRD EMBODIMENT OF SUBSAMPLING FILTER/INTERPOLATING CIRCUIT

Subsampling Filter

Figure 13:
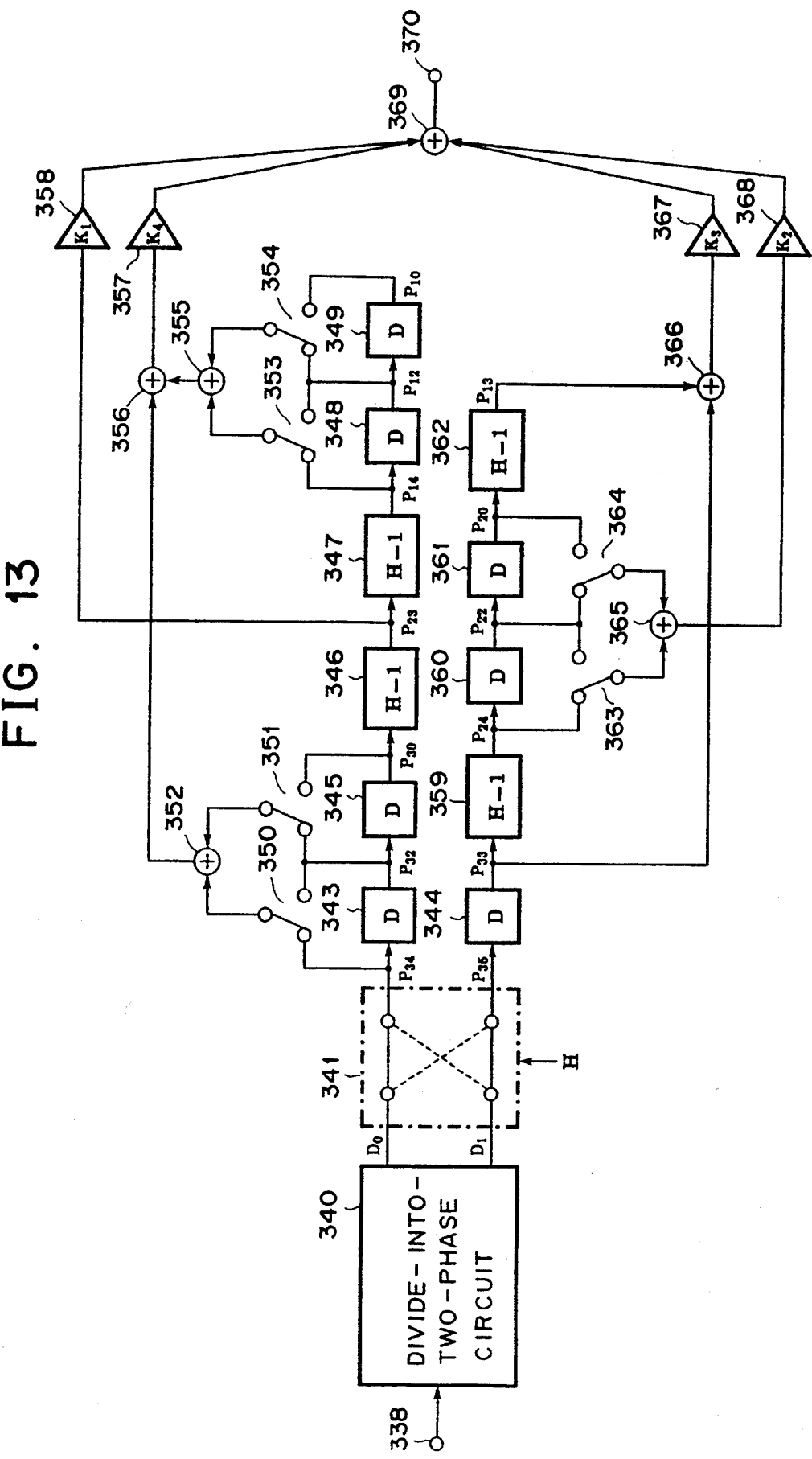
FIG. 13 is a block showing a further subsampling circuit of the recording system.

FIG. 13 shows another form of subsampling filter of the invention. The subsampling filter includes a divide-into-two-phase circuit 340 and a switching 341 which operate in the same manner as those in FIG. 4. One output of the switch 341 is inputted to a delay circuit 343 that stores one picture element therein while the other output of the switch 341 is inputted to another delay circuit 344 that stores one picture element therein. When switches 350-351, 353-354, and 363-364 are positioned as shown in FIG. 13, an adder 352 outputs the sum of the inputs to the delay circuits 343 and 345 to an adder 356.

A delay circuit 345 receives the output of delay circuit 343 and outputs it to a line memory 346 which stores as many picture elements as "one line minus one picture element." The output of line memory 346 is supplied to a line memory 347 which stores as many picture elements as "one line minus one picture element." The output of the line memory 346 also supplied to a multiplier 358 which outputs a signal multiplied by a coefficient K1. A delay circuit 348 receives the output of line memory 347 and supplies it to a delay circuit 349. An adder 355 adds the inputs to the delay circuits 348 and 349 and outputs the sum to the adder 356 which in turn outputs the sum of the outputs of the adders 352 and 355 to a multiplier 357.

The output of delay circuit 344 is supplied to a line memory 359 which stores as many picture elements as "one line minus one picture element." A delay circuit 360 receives the output of line memory 359 and supplies it to a delay circuit 361. A line memory 362 receives the output of delay circuit 361 and stores as many picture elements as "one line minus one picture element." When switches 363 and 364 are positioned as shown in FIG. 13, an adder 365 adds the inputs to the delay circuits 360 and 361 and outputs the sum to a multiplier 368 which provides the output of adder 365 multiplied by a coefficient K2. An adder 366 provides the sum of the outputs of line memory 362 and delay circuit 344 to a multiplier 367 which outputs a signal multiplied by a coefficient K3. An adder 369 receives the outputs of multipliers 357-358 and 367-368 and provides the sum of these outputs.

The compressed progressive scanning lines L1, L2, L3, . . . as shown in FIG. 5a are inputted to an input terminal 338. The scanning lines are supplied in the order of La1, Lb2, La3, . . . to the delay circuit 343 while the scanning lines are supplied in the order of Lb1, La2, Lb3, La4, . . . to the delay circuit 344.

In FIG. 13, when the line L3 in FIG. 5a is inputted to the input terminal 338, the line La3 is supplied as a data DO to the divide-into-two-phase circuit 341 and the line Lb3 is supplied as a data D1. The lines La3 and Lb3 are supplied to the delay circuits 343 and 344 via solid lines of the switch 341.

When a picture element P34 is inputted to the delay circuit 343 while at the same time another picture element P35 is inputted to the other delay circuit 344, picture elements P32 and P30 are outputted from the delay circuits 343 and 345, respectively. Picture elements P23 and P14 are outputted from the line memories 346 and 347, respectively. Picture elements P12 and P10 are outputted from the delay circuits 348 and 349, respectively. Meanwhile, a picture element P33 is outputted from the delay circuit 344. A picture element P24 is outputted from the line memory 359 and a picture element P22 is outputted from the delay circuit 360. A picture element P20 is outputted from the delay circuit 361 and a picture element P13 is outputted from the line memory 362.

Since the switches 350-351 and 353-354 are positioned as shown in FIG. 13, a picture element P23' is calculated as follows:

$$P23' = K1\,P23 + \\ K2(P22 + P24) + \\ K3(P13 + P33) + \\ K4(P12 + P14 + P32 + P34)$$

Subsequently, when a picture element P36 is inputted to the delay circuit 343 while at the same another picture element P37 is inputted to the other delay circuit 344 from the switch 341, picture elements P34 and P32 are outputted from the delay circuits 343 and 345, respectively. Picture elements P25 and P16 are outputted from the line memories 346 and 347, respectively. Picture elements P14 and P12 are outputted from the delay circuits 348 and 349, respectively. Meanwhile, a picture element P35 is outputted from the delay circuit 344. A picture element P26 is outputted from the line memory 359 and picture elements P24 and P22 are outputted from the delay circuits 360 and 361, respectively. A picture element P15 is outputted from the line memory 362. Accordingly, a picture element P25' is calculated in accordance with the following expression by and outputted from the adding circuit 369.

$$P25' = K1\,P25 + \\ K2(P24 + P26) + \\ K3(P15 + P35) + \\ K4(P14 + P16 + P34 + P36)$$

Then, when L4 in FIG. 5a is inputted to the input terminal 338, the line La4 is supplied as a data DO to the switch 341 and the line Lb4 is supplied as a data D1. At this time, the switch 341 has been switched to the positions depicted by dotted lines, so that the lines La4 is supplied to the delay circuit 344 and Lb4 to the delay circuit 343. When a picture element P45 is inputted to the delay circuit 343 while at the same time a picture element P44 is inputted to the delay circuit 344, picture elements P43 and P41 are outputted from the delay circuits 343 and 345, respectively. Picture elements P32 and P25 outputted from the line memories 346 and 347, respectively. Picture elements P23 and P21 are outputted from the delay circuits 348 and 349, respectively. Meanwhile, a picture element P42 is outputted from the delay circuit 344. A picture element P35 is outputted from the line memory 359. Picture elements P33 and P31 are outputted from the delay circuits 360 and 361, respectively. A picture elements P22 is outputted from the line memory 362.

Since the switch 350-351, 353-354, and 363-364 are switched to the positions opposite to those shown in FIG. 13, a picture element P32' is calculated as follows:

$$P32' = K1\,P32 + \\ K2(P31 + P33) + \\ K3(P22 + P42) + \\ K4(P21 + P23 + P41 + P43)$$

In this manner, compressed progressive scanning lines L1, L2, L3, . . . as shown in FIG. 5d are produced.

Interpolating Circuit

Figure 14:
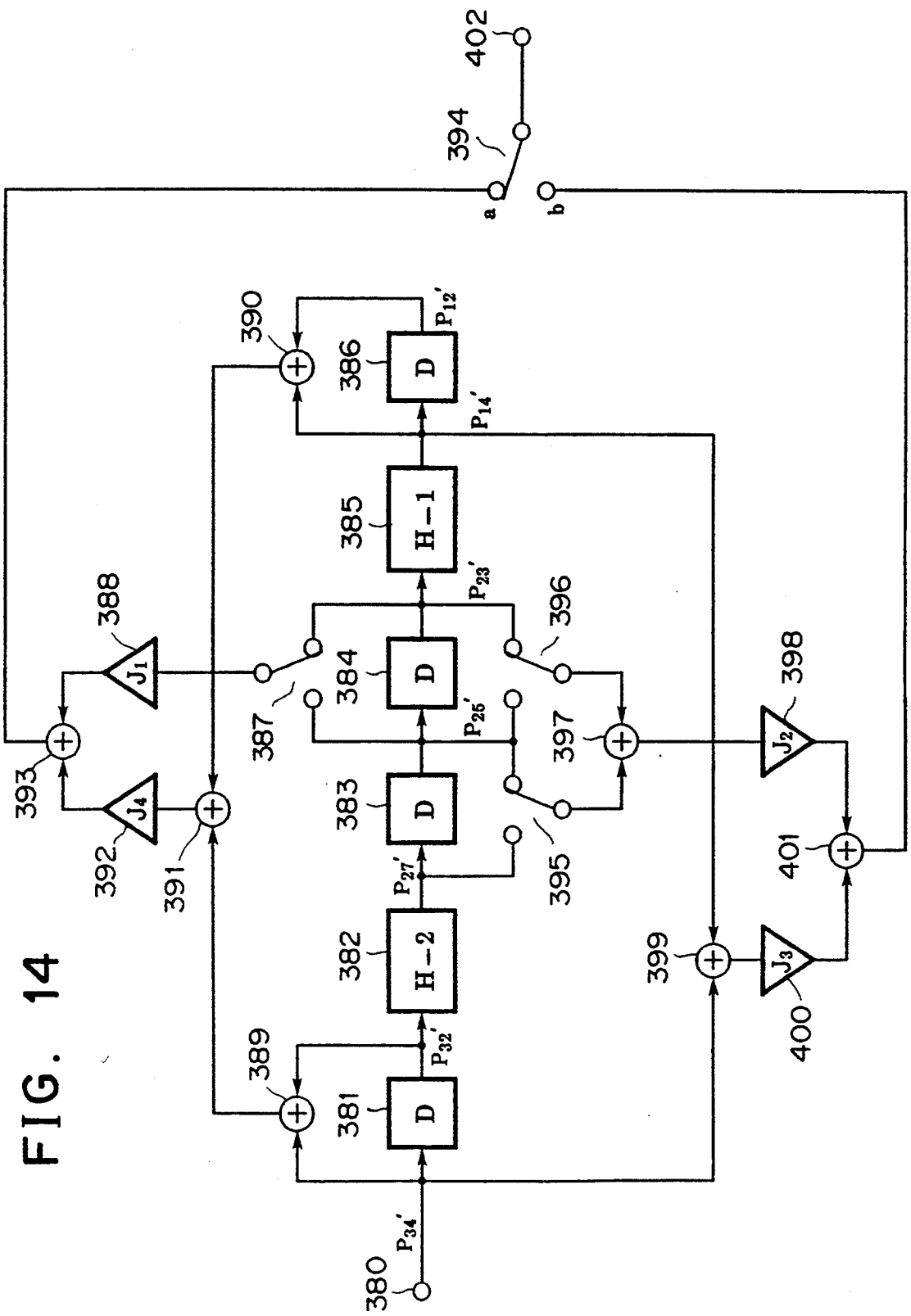
FIG. 14 is a block diagram showing a further interpolating circuit of the reproducing system.
Figure 15:
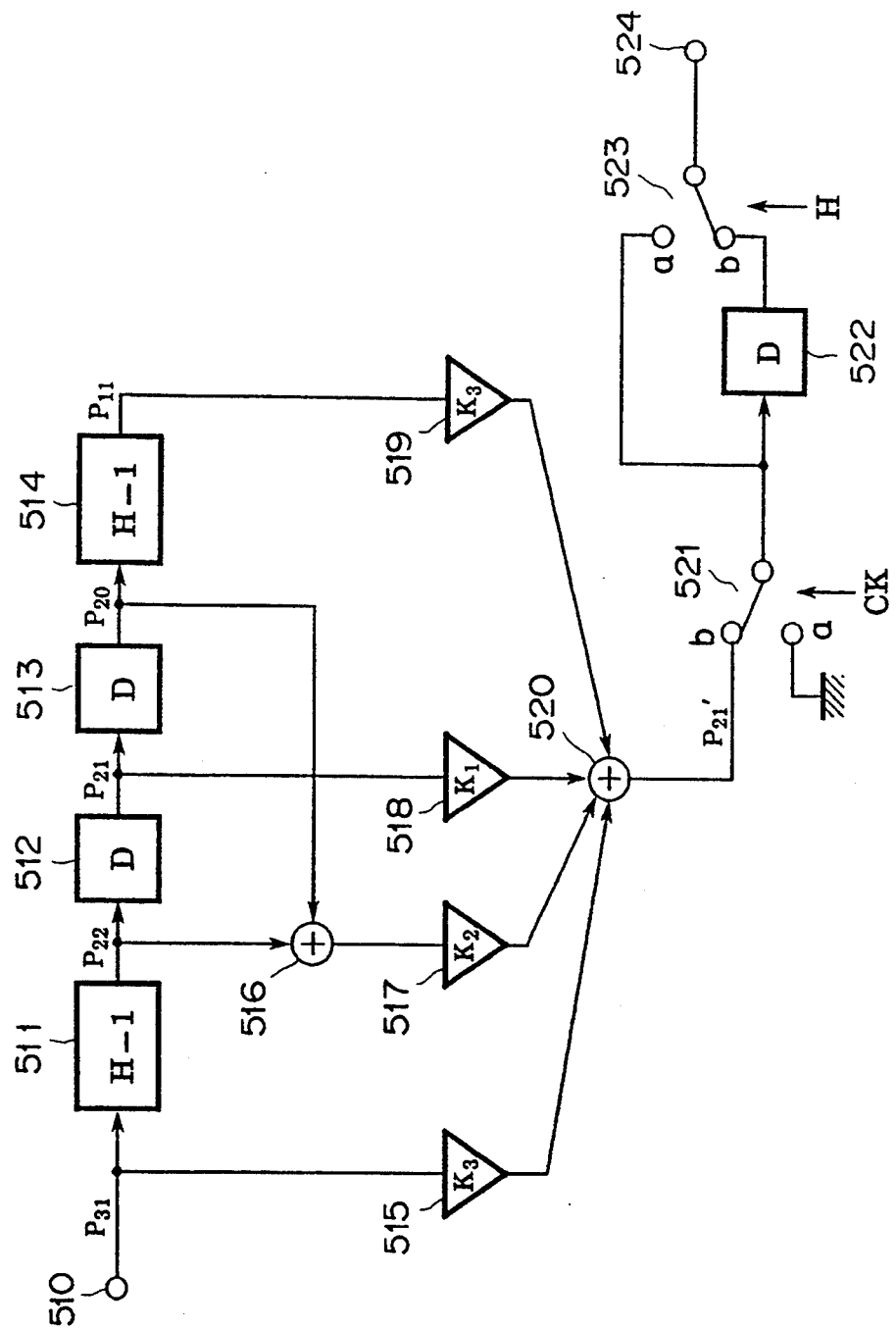
FIG. 15 is a block diagram showing a conventional subsampling circuit.
Figure 17A:
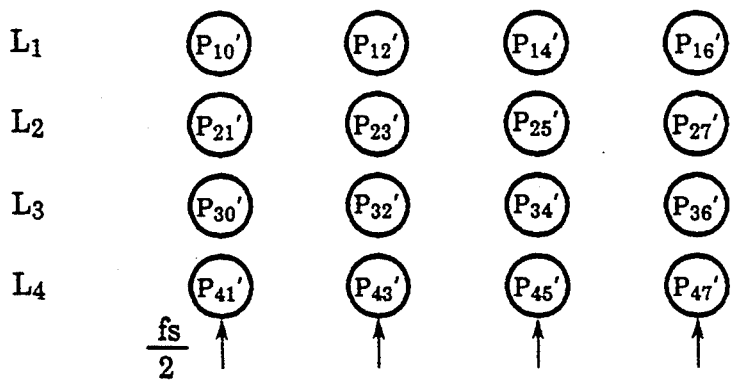
FIGS. 17a–17d are diagrammatic representations illustrating the conventional interpolating operation.
Figure 17B:
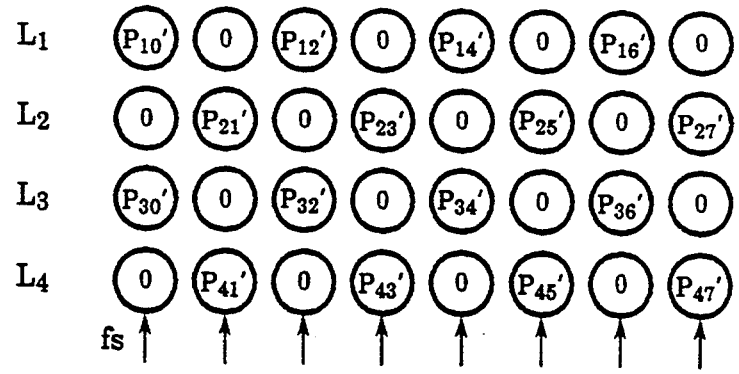
Figure 17C:
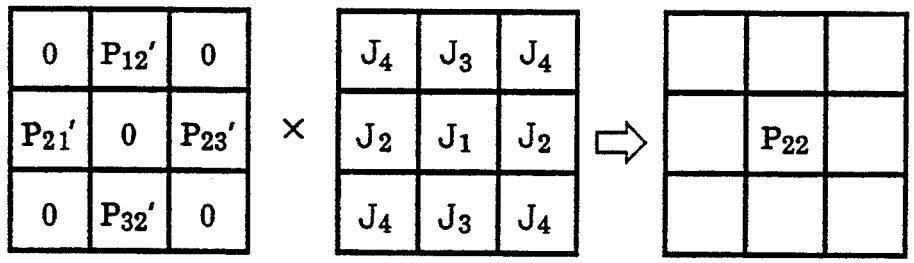
Figure 17D:
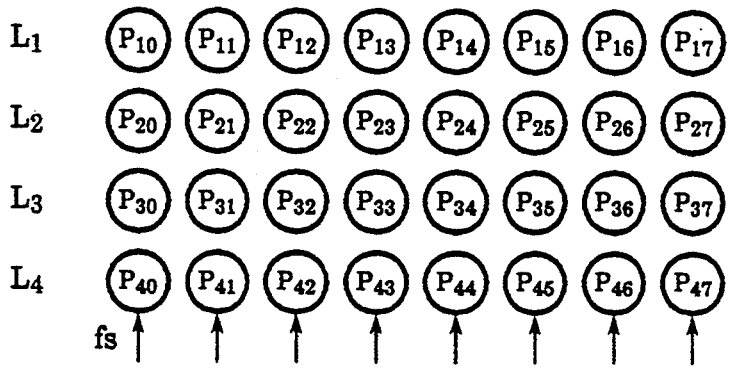

FIG. 14 shows another form of a video signal interpolating circuit according to the invention. The video signal interpolating circuit recovers the original video signal from the compressed video signal that was provided by the circuit in FIG. 13. A delay circuit 381 stores one picture element therein. The output of delay circuit 381 is supplied to a line memory 382 which stores as many picture elements as "one line minus two picture elements." A delay circuit 383 receives the output of line memory 382 and transfers it to a succeeding delay circuit 384. The output of the delay circuit 384 is supplied to a line memory which stores as many picture elements as "one line minus one picture element." The output of the line memory 385 is supplied to a delay circuit 386. An adder 389 outputs the sum of the input to delay circuit 381 and the output thereof to an adder 391. A multiplier 392 outputs a signal multiplied by a coefficient J4 to an adder 393. An adder 397 outputs the sum of the outputs of delay circuits 383-384 to a multiplier 398 when switches 395-396 are positioned as shown in FIG. 14, and the sum of the inputs to the delay circuits 383–384 when the switches 395–396 are positioned oppositely to those shown. An adder 390 outputs the sum of the input to the delay circuit 386 and the output thereof to the adder 391. A switch 387 selectively supplies the input to the delay circuit 384 and the output thereof to a multiplier 388 which outputs a signal multiplied by a coefficient J1 to the adder 393. The switch 393 outputs the sum of the outputs of the multipliers 392 and 388 to a switch 394. A multiplier 398 provides the output of adder 397 multiplied by a coefficient J2 to an adder 401 and a multiplier 400 supplies the adder 401 with the outputs of the adder 399 multiplied by a coefficient J3. The switch 394 selectively supplies an external circuit with the outputs of the adders 393 and 401.

The compressed scanning lines L1(picture element P10', P12', ...), L2(picture elements P21', P23', ...), L3(picture elements P30', P32', ...), FIG. 9a are inputted to the circuit in FIG. 14.

When a picture element P34' of the line L3 is inputted to the input terminal 380, a picture element P32' is outputted from the line memory 381, a picture element P27' from the line memory 382, picture elements P25' from the delay circuit 383, and a picture element P23' from the delay circuit 384. Further, a picture element P14' is outputted from the line memory 385, and a picture element P12' from the delay circuit 386. Since the switches 387, 395, and 396 are positioned as shown in FIG. 14, a picture element P23 is calculated as follows and is outputted from the adder 393.

$$P23 = J1 P23' + J4(P12' + P14' + P32' + P34')$$

Meanwhile, a picture element P24 is calculated as follows and is outputted from the adder 401.

$$P24 = J2(P23' + P25') + J3(P14' + P34')$$

The switch 394 is switched at a frequency of fs to the position a to output P23 and to the position b to output P24. Thus, the original video signal as shown in FIG. 9b is recovered.

What is claimed is:

1. A video signal system converting circuit, comprising:
    a vertical interpolating circuit for interpolating picture elements between adjacent scanning lines of a current field of an interlaced scanning video signal by the use of a median filter, said median filter producing an interpolated picture element having a median value of color density of a first picture element in a line of said current field, a second picture element in a preceding line corresponding to said first picture element of said current field, and a third picture element in a scanning line of a preceding field positioned between said current and preceding lines; and
    a vertical filter circuit for producing a weighted sum of said interpolated picture element and picture elements in said adjacent scanning lines, said vertical filter circuit outputting said weighted sum as a new picture element of a sequential scanning video signal.

2. A video signal system converting circuit as claimed in claim 1, wherein said interlaced scanning video signal is a high definition television signal having 1125 scanning lines, and said sequential scanning video signal has 525 scanning lines.

* * * * *